P. S. JENKINS.
Hedge-Fence.

No. 203,545.  Patented May 14, 1878.

WITNESSES
Saml R Turner
Perry B. Turpin

INVENTOR
Perry S. Jenkins
By R.S. & A.P. Lacey ATTORNEY

UNITED STATES PATENT OFFICE.

PERRY S. JENKINS, OF NEW LIBERTY, KENTUCKY.

IMPROVEMENT IN HEDGE FENCES.

Specification forming part of Letters Patent No. 203,545, dated May 14, 1878; application filed February 11, 1878.

*To all whom it may concern:*

Be it known that I, PERRY S. JENKINS, of New Liberty, in the county of Owen and State of Kentucky, have invented certain new and useful Improvements in Hedge Fences; and I do hereby declare that the following is a full, clear, and exact description thereof, which will enable others skilled in the art to which it appertains to make and use the same, reference being had to the accompanying drawings, and to letters of reference marked thereon, which form a part of this specification.

My invention has for its object to produce a hedge fence which will be a perfect barrier to the passage of stock of all kinds, and particularly adapted to prevent hogs from getting through it.

Ordinary hedge fences during the first two or three years of their growth are effective barriers; but when the plants have grown strong, with large stalks, they raise the hedge from the ground, and openings are formed below, through which hogs and other small animals can readily pass.

By my invention these difficulties are obviated, and there is preserved on the surface of the ground a dense hedge, no difference what may be the age or growth of the plants.

It consists in a base composed of a central plat, formed by the plants, which are woven together close to the ground, and in stay or guy branches, which are so arranged and rooted as to hold the central plats always down to the ground. From the base thus formed the hedge is grown and trimmed to any desired shape.

Figure 1:
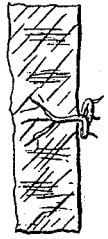
Figure 1:
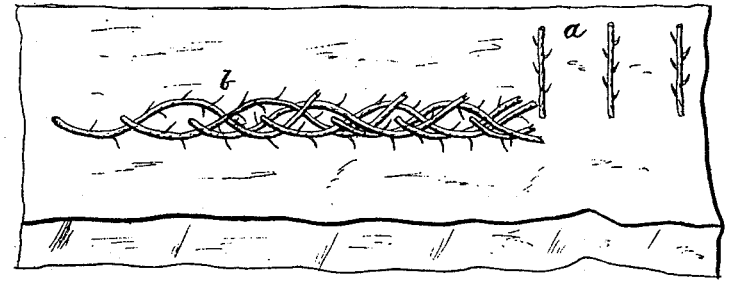
Figure 2:
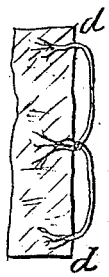
Figure 2:
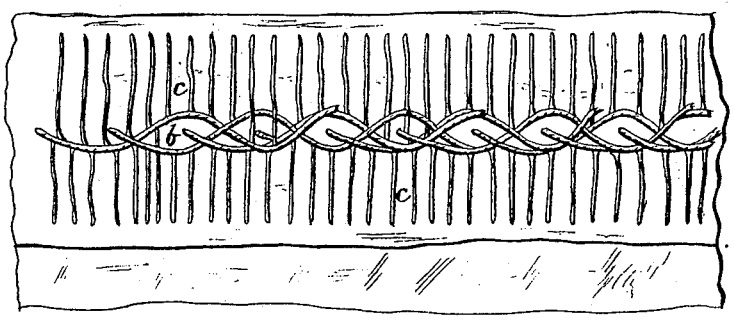
Figure 3:
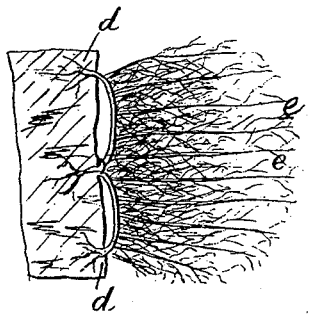
Figure 3:
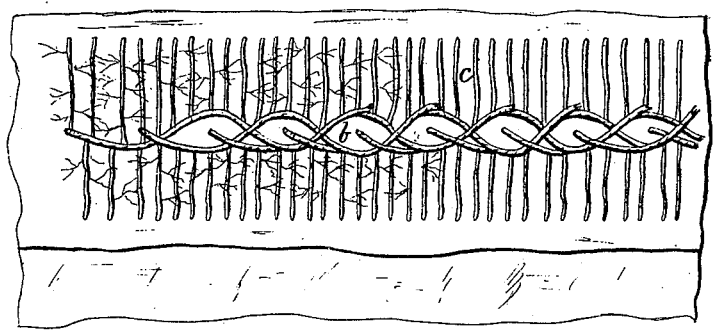

In the drawings, Figure 1 shows the manner of weaving the plants, at one year's growth, into a central plat. Fig. 2 shows the hedge-base formed with the second year's growth, and Fig. 3 represents the completed hedge.

Cross-sections of each figure are exhibited at the left-hand end of each.

The ground is broken in a strip about eight feet wide by throwing the earth each way from the center of the plat, thus leaving an open furrow in the center. This open furrow is deepened by any ordinary means to a depth of about twelve inches. This ditch is then filled partially with rich earth, and the plants are set therein, being placed usually from six to eight inches apart. The object of setting the plants to so great depth is to prevent the roots from running outward near the surface, beyond the outer side of the hedge, where they would be cut by the plow, and thus cause the plants to spread and grow out over the field. The soil in the eight-foot plat is now turned back to the plants, leaving the surface level and smooth.

The plants are properly cultivated for the period of one year, when they will have grown into long slender switches, as shown at *a*, Fig. 1. The plants or switches (beginning at one end of the hedge-row, and taking one at a time) are turned down to the ground and woven together in the manner shown in the several figures. When all are woven together, as shown, they form a compact plat, *b*, being close on the ground, thus forming a substantial center from which the stay or guy branches are grown.

The weaving of the plants, as above explained, is done in the fall of the year, for reasons well known to all persons acquainted with hedge-growing.

During the second year's growth the woven plants will throw out branches horizontally and vertically along the entire length of the plat *b*. The branches which grow vertically are kept cut back close to the plat, while the horizontal branches *c* are permitted to grow, as shown in Figs. 2 and 3. The cutting back of the vertical branches throws the strength of the entire growth into the horizontal branches, and gives to the latter a vigor which causes them to grow to a length necessary to form the base of the hedge-row, as hereinafter explained, and gives them strength and hardiness to resist injury from frost, and causes them to attain a size in growth that will, during the succeeding year, throw up strong vigorous branches, of which the hedge-row is made.

In the spring following the second year's growth and treatment, as hereinbefore explained, the ends of the horizontal branches *c* are laid down and covered in furrows or trenches formed about eighteen inches away from and parallel with the center plat *b*, where they take root, as shown at *d* in Figs. 2 and 3. When thus laid down the ground is nearly or quite covered with the center plat and horizontal branches, and in this manner is formed the base of the hedge-row. From the center plat and the horizontal branches there will now spring up a dense growth, which may be trimmed into any desired shape, by cutting back, shortening, &c., as illustrated at e, Fig. 3.

A hedge-row grown from a base formed in the manner hereinbefore set forth will possess numerous advantages over all ordinary hedge fences. The base is grown strong, and is not liable to become thinned out by the branches dying as the plants attain age and size, but a dense undergrowth close to the ground is always maintained.

The center plat, if left alone in the manner described, would, after two or three years, be raised from its contact with the ground, and holes through which animals could pass would be formed.

When the side branches c are carried out and planted as described, they act as braces or guys, which hold the center plat always as close to the ground as when they were first interwoven.

I have, as will be seen, a base formed of three rows of roots propagated from a single row, and these are arranged and grown in such manner as to form for the hedge fence a base that is always flat on the ground, so that no holes through which animals could pass can possibly be found.

Having described my invention, what I claim, and desire to secure by Letters Patent, is—

1. The mode of making hedges by weaving the twigs into a central plat and setting the horizontal branches in the ground off from the central plat, as and for the purpose set forth.

2. The hedge fence consisting of the woven central plat b and brace or guy branches c, arranged on the surface of the ground, and rooted into three rows, and grown and trimmed into any desired form, as set forth.

In testimony that I claim the foregoing as my own I affix my signature in presence of two witnesses.

PERRY S. JENKINS.

Witnesses:
T. J. JENKINS,
R. H. GAYLE.